(12) United States Patent
Gill (10) Patent No.: US 7,280,326 B2
(45) Date of Patent: Oct. 9, 2007

(54) TRILAYER SAF WITH CURRENT CONFINING LAYER

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 542 days.

(21) Appl. No.: 10/903,107

(22) Filed: Jul. 30, 2004

(65) Prior Publication Data

US 2006/0023376 A1 Feb. 2, 2006

(51) Int. Cl.
G11B 5/39 (2006.01)

(52) U.S. Cl. .................... 360/324.12; 360/314

(58) Field of Classification Search ........... 360/324.12, 360/314, 324.2
See application file for complete search history.

(56) References Cited

U.S. PATENT DOCUMENTS

| | | | | |
|---|---|---|---|---|
| 6,271,997 | B1 * | 8/2001 | Gill | 360/314 |
| 6,275,363 | B1 * | 8/2001 | Gill | 360/324.2 |
| 6,693,776 | B2 | 2/2004 | Gill | 360/324.12 |
| 2001/0004307 | A1 * | 6/2001 | Saito et al. | 360/324.12 |
| 2001/0014000 | A1 | 8/2001 | Tanaka et al. | 360/324.12 |
| 2002/0034055 | A1 * | 3/2002 | Seyama et al. | 360/324.12 |
| 2002/0126426 | A1 * | 9/2002 | Gill | 360/324.12 |
| 2002/0126428 | A1 * | 9/2002 | Gill | 360/324.12 |
| 2002/0191348 | A1 * | 12/2002 | Hasegawa et al. | 360/314 |
| 2004/0136121 | A1 * | 7/2004 | Mao et al. | 360/324.11 |

OTHER PUBLICATIONS

Kebin Li et al., "Bragg Reflector Spin-Valve Sensors", www.eng.nus.edu.sg/EResnews/1002/sf/sf_5.html—Oct. 2002.
K. Nagasaka et al., "Giant Magnetroresistance Properties Of Specular Spin Valve Films In A Current Perpendicular To Plane Structure", Jun. 2001, American Institute of Physics, Journal of Applied Physics vol. 89, No. 11, pp. 6943-6945.
Jong-Kee Kim et al., "Enhancement Of Giant Magnetoresistance Properties Of NiO Spin Valves With An Oxidized Free Layer Naturally In The Air", Jun. 2001 American Institute of Physics, Journal of Applied Physics, vol. 89, No. 11, pp. 6946-6948.
T. Zhao et al, "Design And Preliminary Experiment on CCP-CPP Device", Nov. 2001, The University of Alabama.

* cited by examiner

Primary Examiner—Craig A. Renner
(74) Attorney, Agent, or Firm—Zilka-Kotab, PC (57) ABSTRACT

A current perpendicular to plane (CPP) GMR sensor having first and second outer pinned layers and a trilayer free layer therebetween. The free layer includes first and second outer magnetic layers, and a partially oxidized magnetic layer disposed there between. The middle partially oxidized layer is antiparallel coupled with the outer magnetic layers of the free layer by first and second coupling layers which prevent oxygen migration from the central layer into the outer magnetic layers of the free layer. The partial oxidation of the middle layer provides a limited amount of electrical resistance at a desired location within the free layer to increase GMR.

20 Claims, 4 Drawing Sheets

TRILAYER SAF WITH CURRENT CONFINING LAYER

FIELD OF THE INVENTION

The present invention relates to giant magnetoresistive (GMR) sensors and more particularly to a current perpendicular to plane (CPP) sensor having a trilayer free layer with a current confining layer encapsulated therein.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for increased data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

Along with the recent focus on perpendicular recording, researcher have been focusing on developing practical current perpendicular to plane (CPP) sensors such as CPP GMR sensors. This is because such CPP sensors are particularly suited for use in perpendicular recording systems. One challenge associated with the use of CPP GMR sensor is the extremely low sheet resistance of such sensors. As those skilled in the art will appreciate, the performance of a sensor can be measured as dr/R, where R is the over all resistance or sheet resistance of the sensor, and dr is the change in resistance. It can be seen that as the overall resistance R approaches zero, dr also necessarily approaches zero and the GMR performance of the sensor drops off dramatically. For this reason, CPP GMR sensors have not seen practical use in disk drive systems.

One way to alleviate this problem would be to introduce a certain amount of resistance into the sensor. However, such resistance must be added somewhat near the free layer spacer layer region in order to improved dr. Some researchers have attempted to add an oxide layer into the center of the Cu spacer layer such that the spacer layer would consist of a layer of oxide sandwiched between outer layers of Cu. However, such sensors have proven practical, because the oxygen in the oxide layer migrates into other layers, such as the Cu and adjacent free and pinned layer, killing the GMR effect.

Therefore, there is a strong felt need for a practical CPP GMR having a strong GMR effect. Such a sensor would preferably have an acceptable electrical resistance and would not experience oxygen migration into undesired areas of the sensor, such as free layer/spacer layer interface, or the pinned layer spacer layer interface. Such a sensor would preferably also not experience oxygen migration into the spacer layer, since that would increase incoherent electron scattering in the spacer layer and would greatly degrade the performance of the sensor.

SUMMARY OF THE INVENTION

The present invention provides a current perpendicular to plane (CPP) GMR sensor having a synthetic free layer disposed between a pair of pinned layer structures. The free layer includes three magnetic layers, the middle layer being encapsulated between first and second antiparallel coupling layers, which can be for example Ru. The middle, encapsulated layer is partially oxidized so that it provides some electrical resistance becoming an effective current confining layer.

Antiparallel coupling layers such as Ru have the advantageous property that they act as very effective barriers to oxygen migration. By encapsulating the middle oxidized layer between the coupling layers, a desired resistance in the sensor can be achieved, while avoiding any oxygen contamination into undesirable areas of the sensor, such as the free layer/spacer layer interface and the free layer itself.

The middle layer is only partially oxidized, which advantageously provides a limited resistance, allowing a desired amount of current flow in a perpendicular direction through the sensor. This partial oxidation is achieved by providing a limited amount of oxygen $O_2$ during deposition of the middle layer, and results in portions of oxidized material interspersed with portions of un-oxidized material.

The pinned layer structure can be either AFM pinned structures or can be self-pinned (i.e. pinned without use of an AFM layer). Preferably, though, the pinned layer structures are self-pinned so as to minimize electrical resistance in regions away from the free layer/spacer layer interfaces, where such resistance would only degrade performance.

The free layer is configured as a trilayer structure, wherein each layer is antiparallel coupled with its adjacent layer. Therefore, it will be appreciated that the magnetic moments of the outer layers will be in the same direction, while the center or middle layer will have a magnetic moment oriented in the opposite direction. This means that the GMR effect from the outer layers of the free layer will be additive, while that from the center layer will be subtractive. However, by partially oxidizing the center layer, the GMR effect of this layer is significantly reduced. Therefore, the undesirable subtractive GMR effect of the second layer is minimized.

Experiments have shown that oxygen migration into the outer portions of the free layer can be prevented by use of the migration barrier layers such as Ru layers, which prevents oxidation of those outer layers and prevents an increase in the coercivity (Hc) of the free layer which would otherwise reduce the responsiveness of the sensor.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
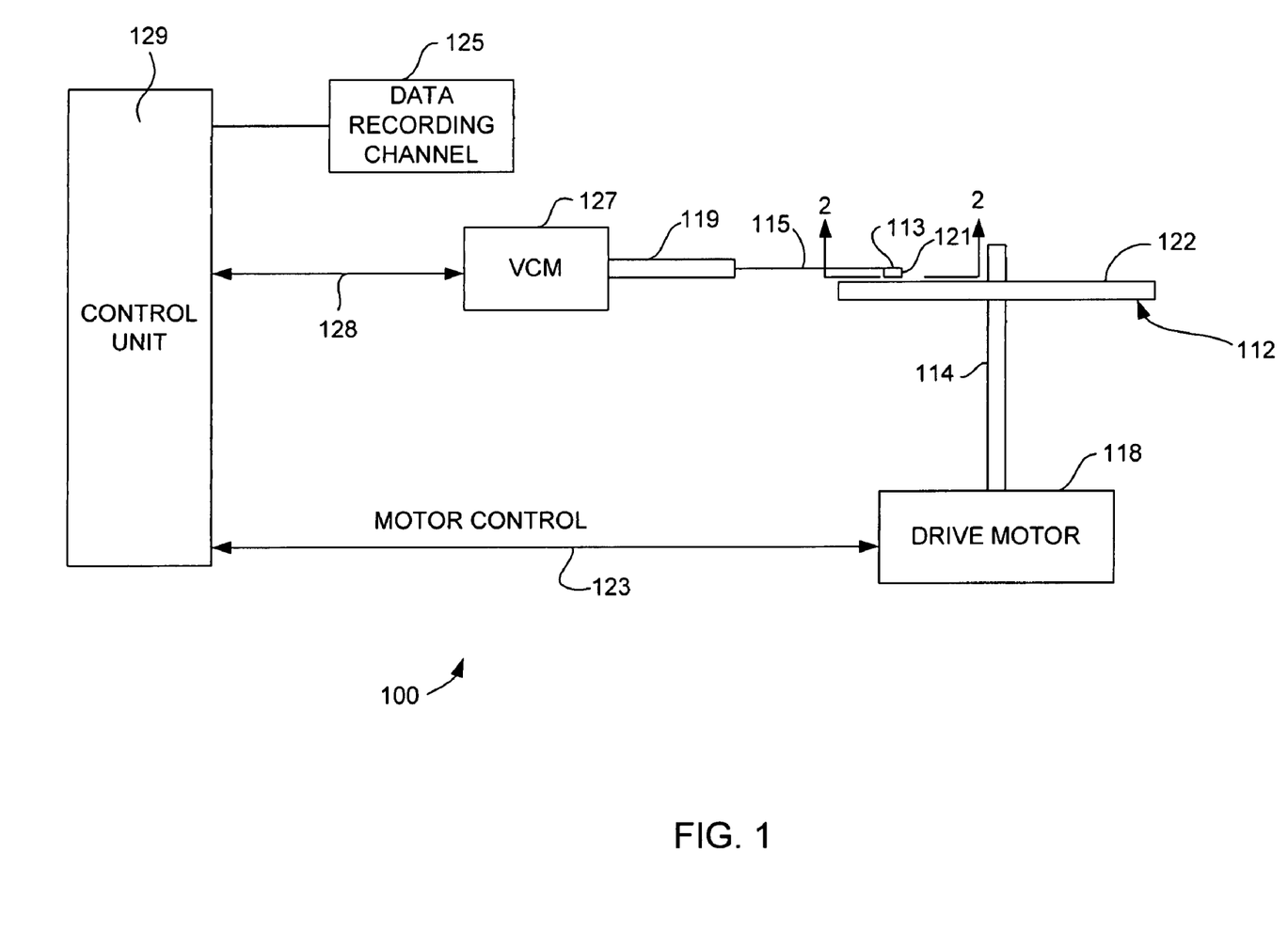
FIG. 1 is a schematic illustration of a disk drive system in which the invention might be embodied.

Referring now to FIG. 1, there is shown a disk drive 100 embodying this invention. As shown in FIG.1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
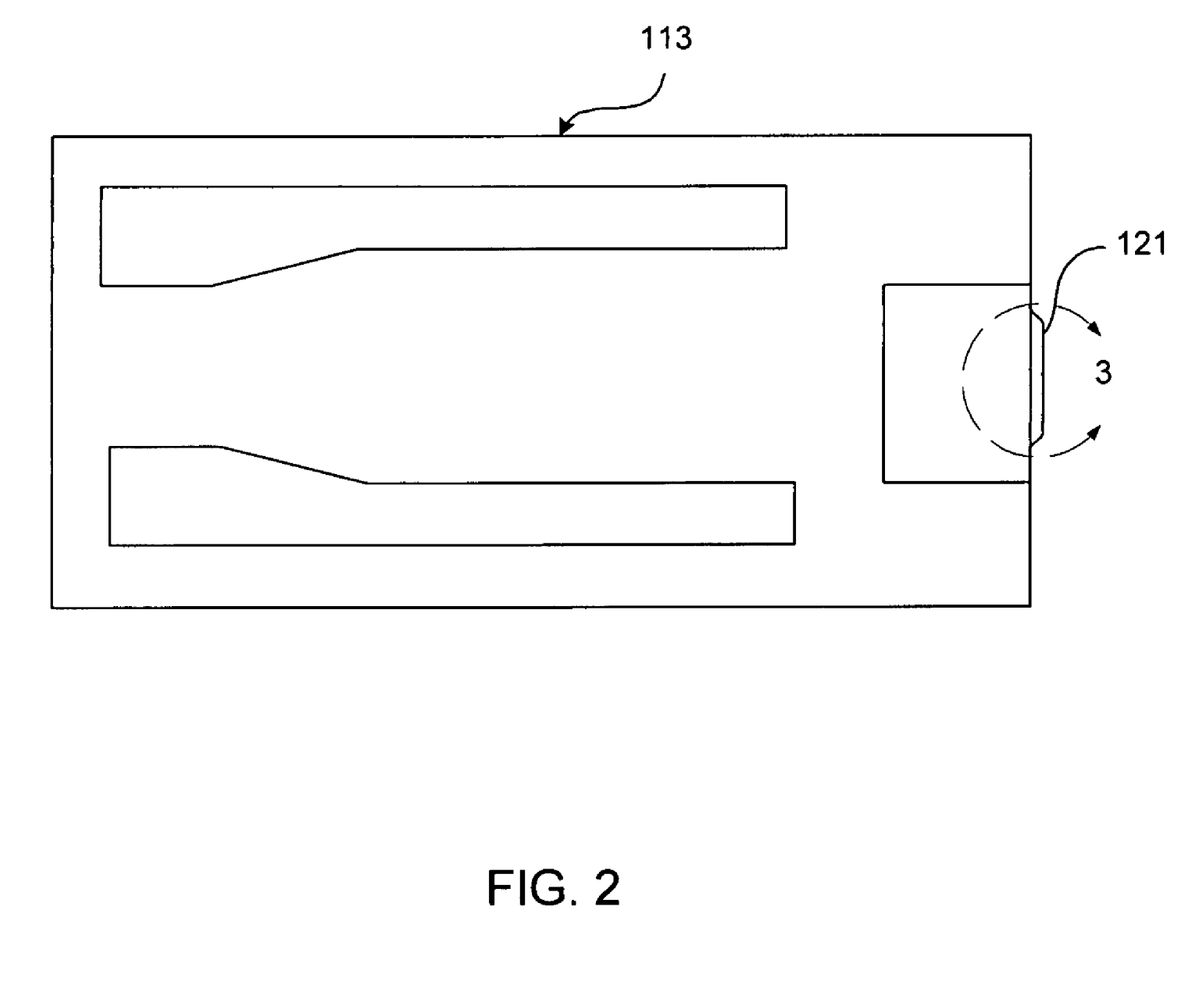
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
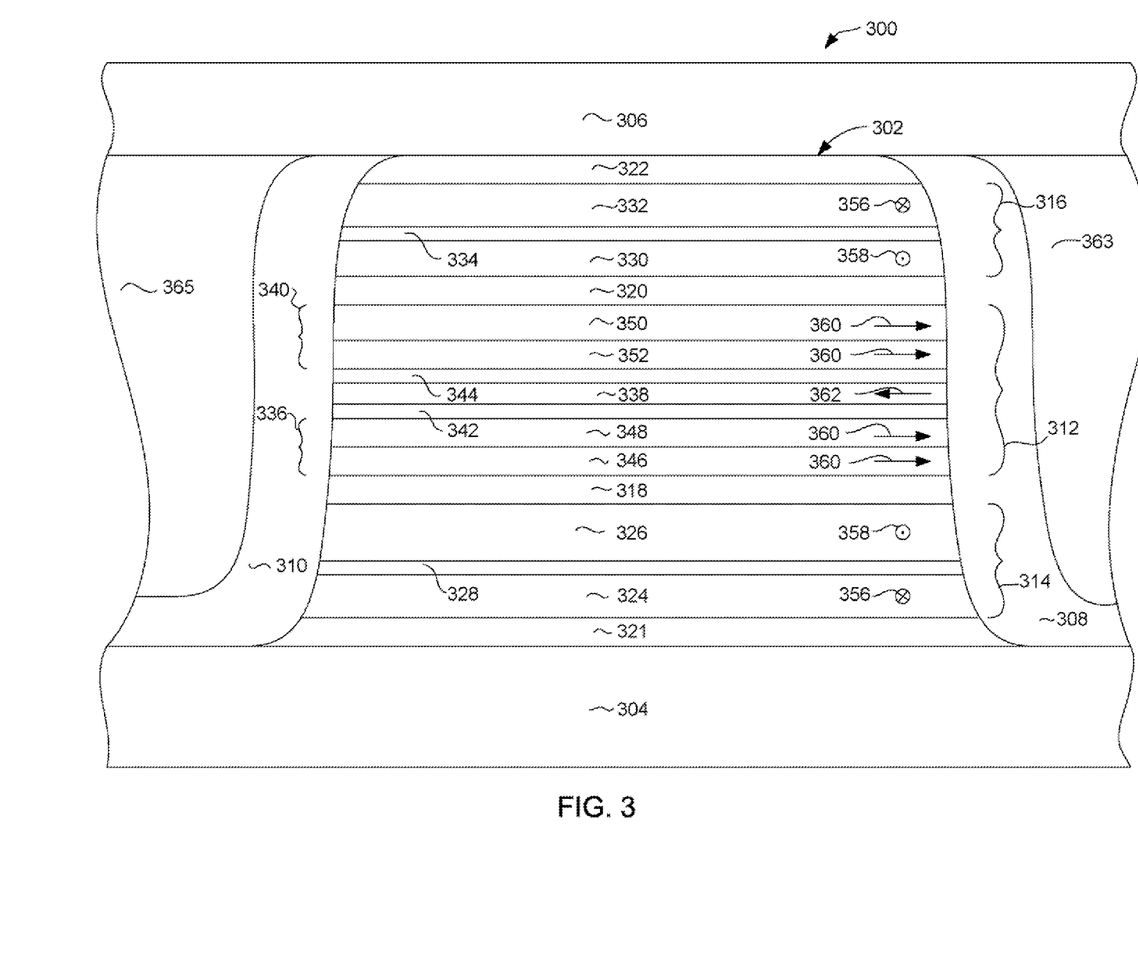
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads. First and second insulation layers 308, 310 extend laterally from the sides of the sensor stack 302 and extend across at least one of the leads 304, 306.

The sensor stack includes a magnetic free layer 312, that is located between first and second pinned layer structures 314, 316. The first pinned layer structure 314 is separated from the free layer structure 312 by a non-magnetic, electrically conductive spacer layer 318, which can be for example Cu. Similarly, the second pinned layer structure 316 is separated from the free layer structure 312 by a second spacer layer 320, which also can be, for example, Cu.

A seed layer 321 may be provided at the bottom of the sensor stack 302 to promote a desired crystalline growth in the subsequently deposited layers. In addition, a capping layer 322, such as Ta can be provided at the top of the sensor stack 302 to protect the various layers of the sensor from damage, such as by corrosion, during subsequent manufacturing processes.

With reference still to FIG. 3, the pinned layer structures are preferably self-pinned structures, which means that they pinned without exchange coupling with a layer of antiferromagnetic (AFM) material. Instead the pinned layers can be pinned by their intrinsic positive magnetostriction in combination with compressive stresses that are inevitably present in the sensor 300. Although the pinned layers 314, 316 are preferably self-pinned, they could also be AFM pinned, and the present invention, would includes such a structure.

The first pinned layer 314 includes a pair of magnetic layers, AP1 324, and AP2 326 that are separated by and antiparallel coupled across a non-magnetic, electrically conductive antiparallel (AP) coupling layer 328. The coupling layer 328 is constructed of a thickness so as to antiparallel couple the AP1 and AP2 layers 324, 326. The coupling layer 328 could be constructed of for example, Ru and could be about 4 to 8 Angstroms thick. The AP1 layer can be constructed of for example $CoFe_{10}$, or a CoFe alloy having about 10 atomic percent Fe. The AP2 layer 326 (that closest to the spacer layer 318) can be constructed of for example $CoFe_{50}$, or a CoFe alloy having about 50 atomic percent Fe.

With continued reference to FIG. 3, the second pinned layer 316 has a structure similar to that of the first pinned layer 314. The second pinned layer includes a pair of magnetic layers AP3 330 and AP4 332, which are separated from one another and antiparallel coupled across a non-magnetic, electrically conductive antiparallel coupling layer 334. The antiparallel coupling layer can be for example Ru, and can have a thickness of about 4 to 8 Angstroms. The AP3 layer 330 can be constructed of for example $CoFe_{50}$, and the AP2 layer 332 can be constructed of for example $CoFe_{10}$.

The free layer structure 312 is a trilayer structure including first, second and third magnetic layers 336, 338, 340. The first magnetic layer 336 is separated from and antiparallel coupled with the second layer 338 by a first non-magnetic, electrically conductive antiparallel coupling layer 342. Similarly, the second magnetic layer 338 and the third magnetic layer 340 are separated from one another and antiparallel coupled by a second non-magnetic, electrically conductive coupling layer 344 The antiparallel coupling layers 342, 344 can be for example Ru and can have a thickness of 4 to 8 Angstroms. The coupling layers 342, 344 could also be constructed of other suitable antiparallel coupling materials such as Cr or Ir, for example.

Each of the outer magnetic layers 336, 340 may include a plurality of sub-layers. The first layer 336 may include a layer of CoFe 346 and a layer of NiFe 348, with the CoFe layer being closest to the spacer layer 318. Similarly, the third layer 340 may include the a layer of CoFe 350 and a layer of NiFe 352 with the CoFe layer 350 preferably being located closest to the spacer layer 320.

Figure 4:
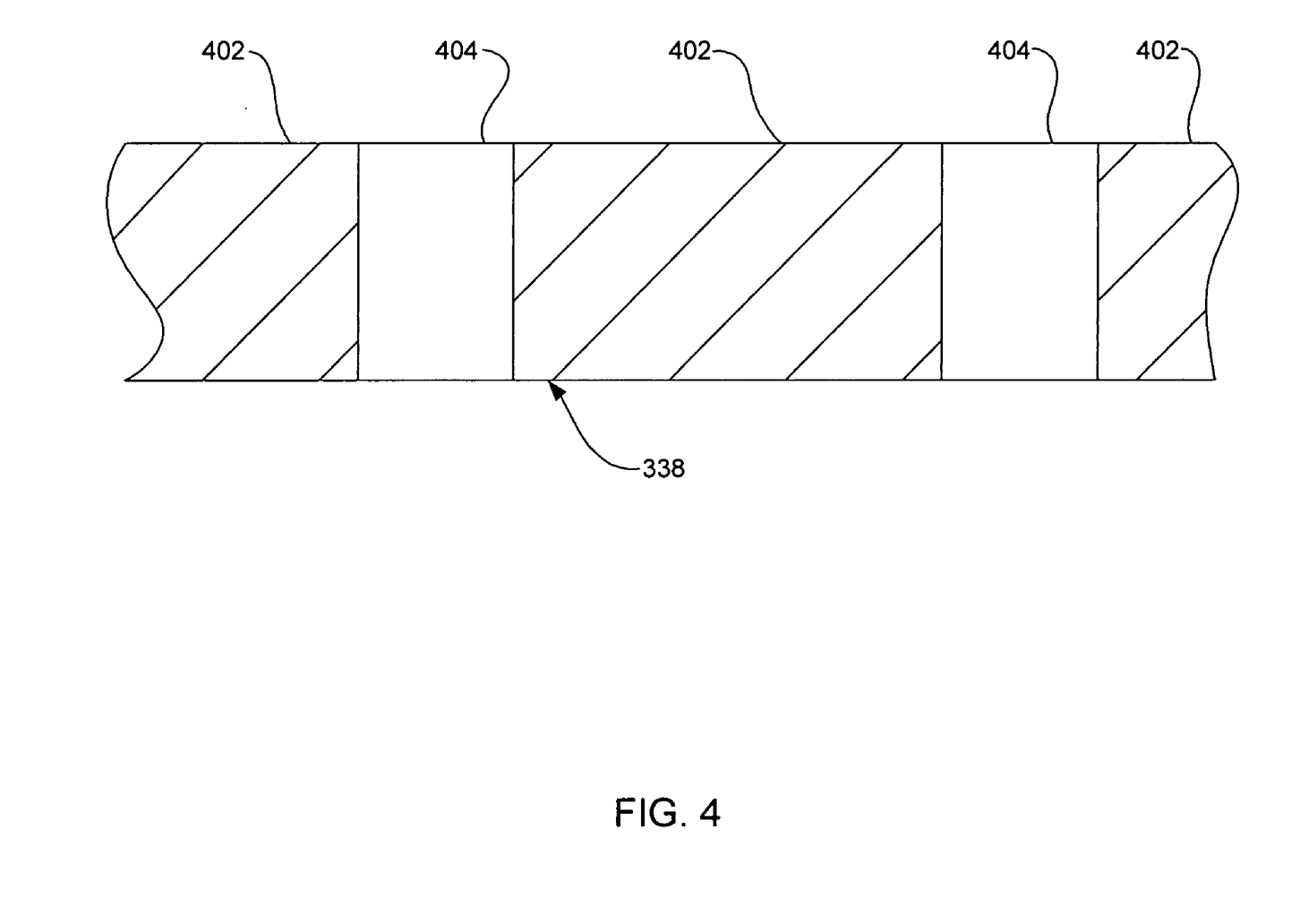
FIG. 4 is an enlarged view of a section of a current confining layer of the present invention.

The second or middle layer 338 of the free layer 312, includes a layer of partially oxidized CoFeOx. This partially oxidized middle layer 338 can be constructed very thin, and could be 5 to 10 Angstroms. The partially oxidized middle layer 338 can be constructed by providing only a limited amount of oxygen during deposition of CoFe. With reference to FIG. 4, which illustrates and enlarged view of a cross section of layer 338, the layer 338 includes portions of oxidized material CoFeOx 402, interspersed with portions of non-oxidized CoFe material 404. The oxidized portions 402 are electrically insulating, while the non-oxidized portions 404 are electrically conductive.

With reference again to FIG. 3, the AP coupling layers 342, 344 encapsulating the middle, partially oxidized layer are migration barriers that keep oxygen from the partially oxidized layer 338 from migrating to the other layers such as the magnetic layers 336, 340 or spacer layers 318, 320. Experimental results have shown that coupling materials, especially Ru provide excellent barriers to oxygen migration.

With reference still to FIG. 3, the pinned layers have magnetic moments 356, 358 pinned perpendicular to the ABS, with the innermost moments 358 being located in the same direction. The free layer 312 has magnetic moments 360, 362 oriented parallel to the ABS, with the outermost moments 360 being oriented in the same direction so as to provide additive GMR effect. Hard bias layers 363, 365 can be provided at either side of the sensor to bias the magnetic moment 360, 362 of the free layer 312 in the desired direction. It can be seen that in inner magnetic layer 338 has a magnetic moment 362 that is antiparallel with the moments 360 of the outer layers 336, 340 of the free layer. This means that any GMR contribution from the middle layer 338 will be subtractive, which reduces the performance of the sensor. However, according to the present invention, since the middle layer is partially oxidized, its magnetic moment is greatly reduced. This means that its subtractive effect on GMR is also advantageously greatly reduced.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A current perpendicular to plane (CPP) giant magnetoresistive (GMR) senor, comprising:
    a first magnetic pinned layer structure;
    a magnetic free layer structure;
    a second magnetic pinned layer structure, the magnetic free layer structure being located between the first and second pinned layer structures;
    a first non-magnetic electrically conductive spacer layer separating the first magnetic pinned layer structure from the magnetic free layer structure;
    a second nonmagnetic electrically conductive spacer layer separating the second pinned layer structure from the magnetic free layer structure;
    the free layer structure further comprising:
        a first magnetic layer;
        a second magnetic layer; and
        a third magnetic layer; wherein
        the second magnetic layer is located between the first and third magnetic layers;
        a first layer of non-magnetic electrically conductive antiparallel coupling material is sandwiched between the first and second magnetic layers;
        a second layer of non-magnetic, electrically conductive antiparallel coupling material is sandwiched between the second and third magnetic layers; and
        the second magnetic layer is partially oxidized.

2. A sensor as in claim 1, wherein the second magnetic layer of the free layer structure comprises NiFeO.

3. A sensor as in claim 1, wherein the second magnetic layer comprises NiFeO interspersed with NiFe.

4. A sensor as in claim 1, wherein the second magnetic layer has a thickness of 5-10 Angstroms.

5. A sensor as in claim 1, wherein the first and third magnetic layers of the free layer structure each comprise NiFe.

6. A sensor as in claim 1, wherein the first and second anti parallel coupling layers each comprise Ru.

7. A sensors in claim 1, wherein the first and second antiparallel coupling layers each comprise Cr.

8. A sensor as in claim 1, wherein the first and second antiparallel coupling layers each comprise Ir.

9. A sensor as in claim 1, wherein the first antiparallel coupling layer has a thickness chosen to antiparallel couple the magnetic moments of the first and second magnetic layers of the free layer structure; and the second antiparallel coupling layer has a thickness chosen to antiparallel couple the magnetic moments of the second and third magnetic layers of the free layer structure.

10. A sensor as in claim 1, wherein the first and second antiparallel coupling layers each have a thickness of 4 to 8 Angstroms.

11. A sensor as in claim 1, wherein at least one of the first and second pinned layer structures is a self pinned structure.

12. A sensor as in claim 1, wherein at least one of the first and second pinned layer structures is pinned by exchange coupling with a layer of antiferromagnetic material.

13. A sensor as in claim 1, wherein at least one of the first and second pinned layer structures is an antiparallel pinned structure having fourth rid fifth magnetic layers that are antiparallel coupled across a third non-magnetic, electrically conduct coupling layer, the fourth and fifth magnetic layers each comprising a material having a positive magnetostriction, the magnetizations of the fourth and fifth magnetic layers have magnetic moments that are pinned by their magnetostriction, in combination with compressive stresses in the sensor, and are not exchange coupled with layer of antiferromagnetic material.

14. A sensor as in claim 1, wherein the first pinned layer structure comprises:
    a fourth magnetic layer (AP1), comprising $CoFe_{10}$;
    a fourth magnetic layer (AP2) disposed adjacent to the first spacer layer and comprising $CoFe_{50}$; and
    a third layer of nonmagnetic, electrically conductive material disposed between the fourth and fifth magnetic layers, the third layer of non-magnetic, electrically conductive material being of such a thickness as to antiparallel couple the magnetic moments of the fourth and fifth magnetic layers.

15. A sensor as in claim 14, wherein the second pinned layer structure comprises:
    a sixth magnetic layer (AP3), disposed adjacent to the first spacer layer and composing $CoFe_{50}$;
    a seventh magnetic layer (AP4) comprising $CoFe_{10}$, and
    a fourth layer of non-magnetic, electrically conductive material disposed between the sixth and seventh magnetic layers, the fourth layer of non-magnetic, electrically conductive material being of such a thickness as to antiparallel couple the magnetic moments of the sixth and seventh magnetic layers.

16. A sensor as in claim 1, wherein the first magnetic layer of the free layer structure comprises a layer of CoFe and a layer of NiFe, and wherein the layer of CoFe is located adjacent to the first spacer layer.

17. A sensor as in claim 1, wherein:
    the first magnetic layer of the free layer structure comprises a first layer of CoFe and a first layer of NiFe, the layer of CoFe being located adjacent to the first spacer layer;
    the second magnetic layer of the free layer structure comprises a second layer of CoFe and a second layer of NiFe and wherein the second layer of CoFe is located adjacent to the second spacer layer.

18. A sensor as in claim 1, wherein the first and second spacer layers each comprise Cu.

19. A sensor as in clam 1, further comprising:
    a seed layer formed beneath the first pinned layer structure;
    a capping layer formed above the second pinned layer structure;
    a first electrically conductive lead formed over the cap layer; and
    a second electrically conductive lead formed beneath the seed layer.

20. A magnetic data recording system comprising:
    a magnetic medium;
    a slider;
    an actuator connected with the slider to move the slider adjacent to a surface of the magnetic medium; and a current perpendicular to plane (CPP) giant magnetoresistive (GMR) sensor connected with the slider, the sensor comprising:
a first magnetic pinned layer structure;
a magnetic free layer structure;
a second magnetic pinned layer structure, the magnetic free layer structure being located between the first and second pinned layer structures;
a first non-magnetic electrically conductive spacer layer separating the first magnetic pinned layer structure from the magnetic free layer structure;
a second non-magnetic electrically conductive spacer layer separating the second pinned layer structure from the magnetic free layer structure;
the free layer structure further comprising:

a first magnetic layer;
a second magnetic layer; and
a third magnetic layer; wherein
the second magnetic layer is located between the first and third magnetic layers;
a first layer of non-magnetic electrically conductive antiparallel coupling material is sandwiched between the first and second magnetic layers;
a second layer of non-magnetic, electrically conductive antiparallel coupling material is sandwiched between the second and third magnetic layers; and
the second magnetic layer is partially oxidized.

* * * * *

UNITED STATES PATENT AND TRADEMARK OFFICE
CERTIFICATE OF CORRECTION

PATENT NO.         : 7,280,326 B2
APPLICATION NO.    : 10/903107
DATED              : October 9, 2007
INVENTOR(S)        : Hardayal Singh Gill It is certified that error appears in the above-identified patent and that said Letters Patent is hereby corrected as shown below:

Col. 7, Line 16 replace "senor," with --sensor,--

Signed and Sealed this

Eighteenth Day of May, 2010

David J. Kappos
*Director of the United States Patent and Trademark Office*